Aug. 15, 1944. N. M. JONES Re. 22,529

FUEL-COOLED INTERNAL COMBUSTION ENGINE

Original Filed June 26, 1942 3 Sheets-Sheet 1

Inventor
Nelson M. Jones
By L. F. Randolph
Attorney

Aug. 15, 1944. N. M. JONES Re. 22,529

FUEL-COOLED INTERNAL COMBUSTION ENGINE

Original Filed June 26, 1942 3 Sheets-Sheet 2

Inventor

Nelson M. Jones

By L. F. Randolph

Attorney

FUEL-COOLED INTERNAL COMBUSTION ENGINE

Original Filed June 26, 1942 3 Sheets-Sheet 3

Inventor

Nelson M. Jones

By N. F. Raudnetz

Attorney

Reissued Aug. 15, 1944

Re. 22,529

UNITED STATES PATENT OFFICE 22,529

FUEL-COOLED INTERNAL-COMBUSTION ENGINE

Nelson M. Jones, Sarasota, Fla., assignor to Greene's Fuel, Incorporated, Sarasota, Fla., a corporation of Florida Original No. 2,296,790, dated September 22, 1942, Serial No. 448,616, June 26, 1942. Application for reissue April 17, 1943, Serial No. 483,398

19 Claims. (Cl. 123—133)

This invention relates to an internal combustion engine and particularly to one which will be cooled by the fuel in its passage to the carburetor or combustion means, utilizing the refrigerating effect produced as the fuel passes from the liquid to the gaseous state.

While the invention is not limited to use in connection with airplane engines, yet an important object of the invention is to produce an engine of the present character which can be totally enclosed within a wing or other structure of an airplane and still be adequately cooled without projections extending into the outside air.

I further aim to provide a structure which is exceedingly compact, durable and efficient and wherein a blower of "super-charger" type may be employed in the combination to induce cooling air through the jackets of the engine cylinders and then deliver same to a mixing valve under pressure.

The more specific objects and advantages will become apparent from a consideration of the description following taken in connection with accompanying drawings illustrating an operative embodiment.

Some of the objects of the invention having been stated, other objects will appear as the description proceeds, when taken in connection with the accompanying drawings, in which—

Figure 1:
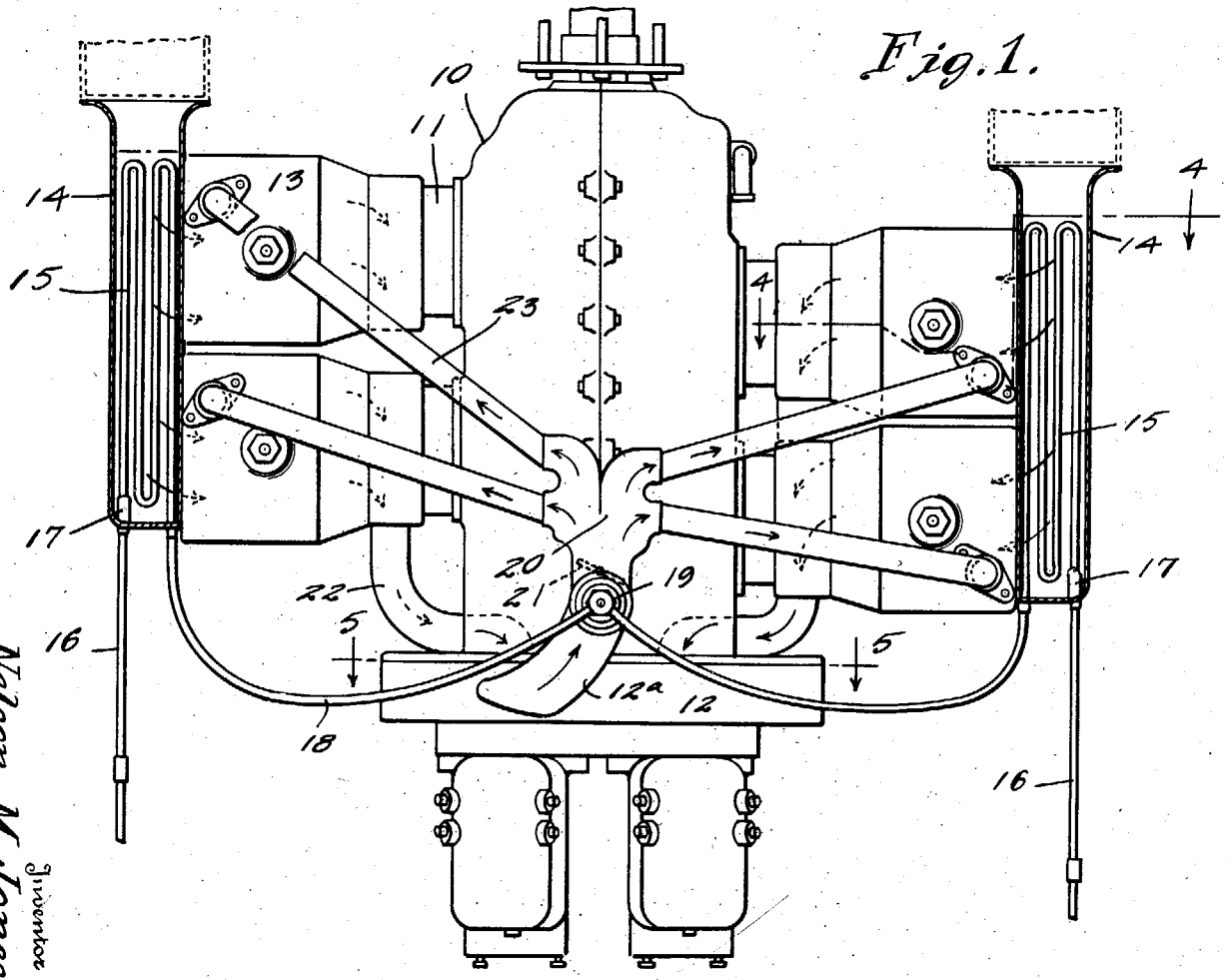
Figure 1 is a plan view, partly in section to disclose details, of an airplane engine embodying my invention.
Figure 2:
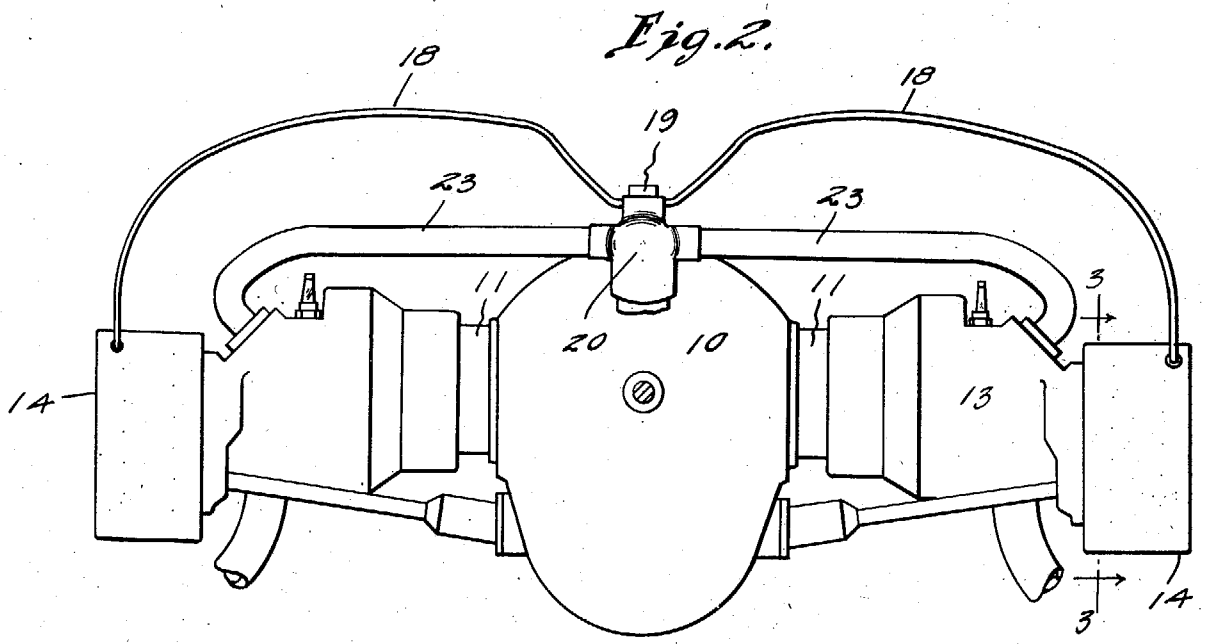
Figure 2 is an end elevation thereof.
Figure 3:
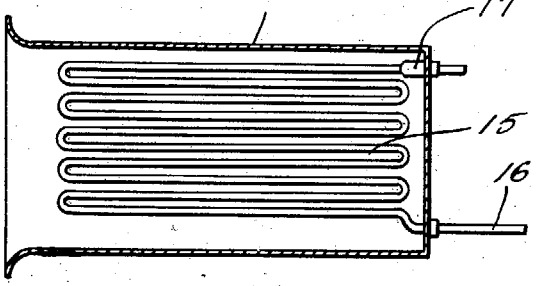
Figure 3 is a detail section taken on the line 3—3 of Figure 2.
Figure 4:
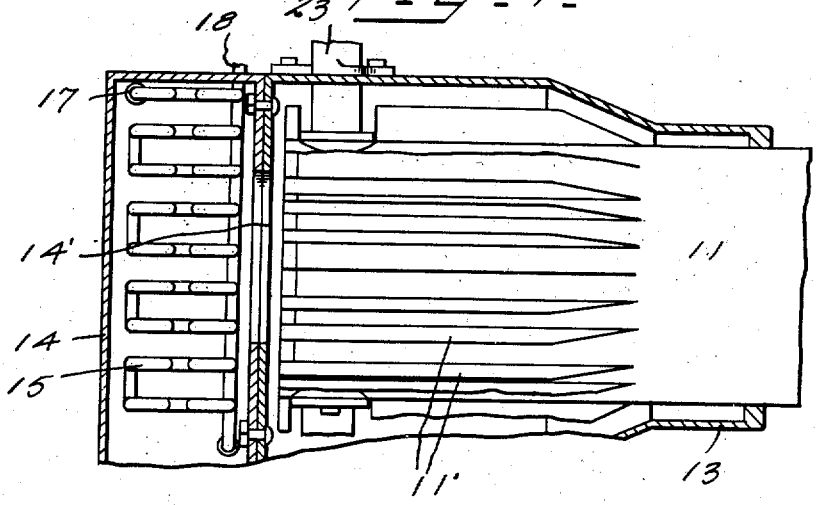
Figure 4 is a detail view showing a cylinder and cooling coil.
Figure 5:
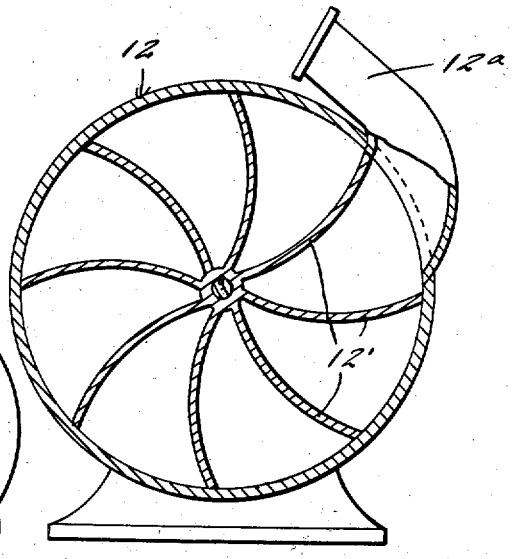
Figure 5 is a view, partly in section, of the blower.
Figure 6:
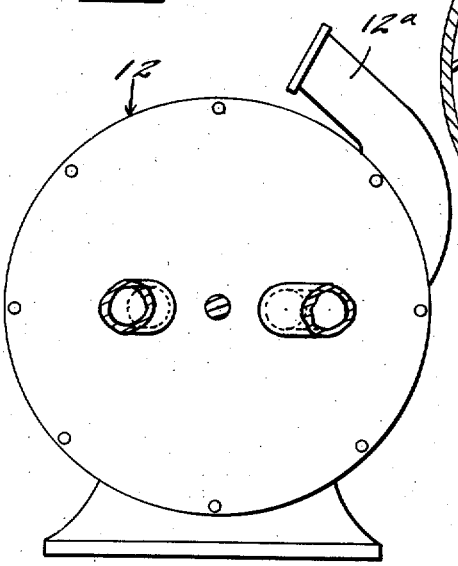
Figure 6 is a view of the blower in elevation.

Referring specifically to the drawings wherein like reference characters designate like or similar parts, an internal combustion engine is generally shown at 10 and specifically it is a conventional aircraft engine of air-cooled design with my improvements added or incorporated. The cylinders 11 are shown as four in number although any number thereof can be used and arranged as opposed cylinders, in line, or in various combinations thereof according to the use desired of the engine. The engine illustrated includes a super-charger or blower at 12, of the type conventionally used on aircraft or other internal combustion engines, but the super-charger may be dispensed with, if desired.

Cylinders 11 are vertically finned for air-cooling and in accordance with my invention are covered by suitable sheet metal or other shrouds 13 and attached thereto at the heads of the cylinders and communicating with the interior of the shrouds are sheet metal or other air ducts or casings 14.

Disposed within each casing is a coil 15. Conduits or pipes 16 lead from any suitable source or sources of liquid petroleum and between such pipes 16 and coils 15, preferably within the ducts 14, are expansion valves 17. Such valves 17 serve to expand and vaporize the liquid fuel drawn from the pipe 16 to produce a refrigerating effect, accordingly cooling the air which passes through the ducts 14 and into the shrouds 13, and conveying the fuel as a gas through the coils 15.

A gaseous fuel is conveyed by a pipe or conduit 18 to a mixing valve 19, in communication with a mixing chamber or manifold 20, arranged in communication with the blower or super-charger 12 as shown, or the air ducts may open into the atmosphere or run directly to the mixing valve where a supercharger is not employed. A conventional throttle valve 21 is located within the mixing chamber or manifold 20.

The blower or super-charger 12, when employed, functions dually to educe or draw in air through the ducts 14, thence through the shrouds 13, and thence through pipes 22 communicating with the interior of the shrouds and also with the super-charger or blower 12, at the same time drawing in the fuel through the pipes 16, coils 15 and pipes 18, through the mixing valve 19, the same admixing with the air in the manifold or mixer 20, and therefrom being educed or blown by the super-charger, through conduits 23 into the cylinders 11, to thus serve as fuel therefor, coacting with the usual piston, firing mechanism, and other parts.

It will be realized that the petroleum used for the refrigerating effect also constitutes the sole fuel used in the engine. Attention is called to the fact that while mixing valve 19 will effectively produce a combustible mixture of the petroleum and air, I can incorporate, if necessary, a pressure regulator for bringing the induced pressure of the gases in coils 15 and conduits 18 to any desired pressure for use in the mixing valve 19 and chamber 20.

The resulting engine will be quite light and powerful, rendering it particularly useful as an aircraft engine. The structure avoids the necessity of employing additional or extraneous devices in connection with the engine which would complicate the same and impair and render impractical use thereof as an aircraft type.

Various changes may be resorted to provided they fall within the spirit and scope of the invention.

In the drawings and specification, there has been set forth a preferred embodiment of the invention, and although specific terms are employed, they are used in a generic and descriptive sense only and not for purposes of limitation, the scope of the invention being defined in the claims.

I claim:

1. In combination with an internal combustion engine having a super-charger and mixing chamber in communication therewith and with the cylinders, means to confine air drawn by the super-charger into the mixing chamber, over parts of the engine to cool the same, means for the supply of hydrocarbon fuel to the mixing chamber, and means for the expansion of said fuel into gas to refrigerate the air passing over said parts.

2. In combination with an internal combustion engine having a super-charger and mixing chamber in communication therewith and with the cylinders, means to confine air drawn by the super-charger into the mixing chamber, over parts of the engine to cool the same, means for the supply of hydrocarbon fuel to the mixing chamber, and means for the expansion of said fuel into gas to refrigerate the air passing over said parts, said confining means comprising shroud means about the engine cylinders in communication with the super-charger.

3. In combination with an internal combustion engine having a super-charger and mixing chamber in communication therewith and with the cylinders, means to confine air drawn by the super-charger into the mixing chamber, over parts of the engine to cool the same, means for the supply of hydrocarbon fuel to the mixing chamber, and means for the expansion of said fuel into gas to refrigerate the air passing over said parts, said confining means comprising shroud means about the engine cylinders in communication with the super-charger and an air inlet duct arranged across the end of the cylinders and in communication with shroud means, the fuel supply means including a coil disposed within the said duct.

4. In combination with an internal combustion engine having a super-charger and mixing chamber in communication therewith and with the cylinders, means to confine air drawn by the super-charger into the mixing chamber, over parts of the engine to cool the same, means for the supply of hydrocarbon fuel to the mixing chamber, and means for the expansion of said fuel into gas to refrigerate the air passing over said parts, said confining means comprising shroud means about the engine cylinders in communication with the super-charger and an air inlet duct arranged across the end of the cylinders and in communication with the shroud means, the fuel supply means including a coil disposed within the said duct, and an expansion valve operable to convert liquid into gas as it passes into the coil.

5. In combination with an internal combustion engine having a mixing chamber in communication with the cylinders, shroud means to confine air drawn into the mixing chamber over parts of the engine to cool the same, means for the supply of hydrocarbon fuel to the mixing chamber, and means enclosed by the shroud means for the expansion of said fuel into gas to refrigerate the air passing over said parts.

6. In combination with an internal combustion engine having super-charger and a mixing chamber in communication with the super-charger and the cylinders, means to confine air drawn into the mixing chamber over parts of the engine to cool the same, means for the supply of hydrocarbon fuel to the mixing chamber, and means for the expansion of said fuel into gas to refrigerate the air passing over said parts, said confining means comprising shroud means about the engine cylinders in communication with the super-charger.

7. In combination with an internal combustion engine having a mixing chamber in communication with the cylinders, means to confine air drawn into the mixing chamber, over parts of the engine to cool the same, means for the supply of hydrocarbon fuel to the mixing chamber, and means for the expansion of said fuel into gas to refrigerate the air passing over said parts, said confining means comprising shroud means about the engine cylinders in communication with the mixing chamber and an air inlet duct arranged across the end of the cylinders and in communication with the shroud means, the fuel supply means including a coil disposed with the said duct.

8. In combination with an internal combustion engine having a mixing chamber in communication with the cylinders, means to confine air drawn into the mixing chamber over parts of the engine to cool the same, means for the supply of hydrocarbon fuel to the mixing chamber, and means for the expansion of said fuel into gas to refrigerate the air passing over said parts, said confining means comprising shroud means about the engine cylinders in communication with the mixing chamber and an air inlet duct arranged across the end of the cylinders and in communication with the shroud means, the fuel supply means including a coil disposed within the said duct, and an expansion valve operable to convert liquid fuel into gas as it passes into the coil.

9. In combination with an internal combustion engine having cylinders, means to confine air and to direct it over and in contact with the cylinders, a mixing valve for the engine, means disposed within the air confining means for vaporizing a hydrocarbon fuel, means for conducting the vapor from the vaporizing means to the mixing valve, the refrigerating effect of the vaporization of the fuel serving to cool the air before it is directed over the cylinders.

10. In an internal combustion engine having cylinders, and a mixing valve, means for supplying hydrocarbon fuel to the mixing valve, shroud means enclosing a part of the engine for confining air passing air over the cylinders, means disposed within the shroud means for the expansion of the fuel into a gas and located in the line of draft of air before it passes over the cylinders to refrigerate the air before it passes over the cylinders.

11. In an internal combustion engine having cylinders, a mixing valve, means for conducting air to the mixing valve and into the cylinders, means for the supply of hydrocarbon fuel to the mixing valve, means for the expansion of the fuel into gas to refrigerate the air before it enters the mixing valve.

12. In combination with an internal combustion engine having a blower, cylinders, and mixing chamber, means to confine air drawn by the blower over parts of the engine to cool the same, means for the supply of hydrocarbon fuel to the mixing chamber, and means for the expansion of said fuel into gas to refrigerate the air passing over said parts.

13. In combination with an internal combustion engine having a blower and mixing chamber and cylinders, means to confine air drawn into the blower over parts of the engine to cool the same, means for the supply of hydrocarbon fuel to the mixing chamber, and means for the expansion of said fuel into gas to refrigerate the air passing over said parts, said confining means comprising shroud means about the engine cylinders in communication with the blower.

14. In combination with an internal combustion engine having a blower, mixing chamber, and cylinders, means to confine air drawn by the blower over parts of the engine to cool the same, means for the supply of hydrocarbon fuel to the mixing chamber, and means for the expansion of the fuel into a gas to refrigerate the air passing over said parts, and said confining means comprising shroud means about the engine cylinders in communication with the blower and an air inlet duct arranged across the end of the cylinders and in communication with shroud means, the fuel supply means including a coil disposed within the said duct.

15. In combination with an internal combustion engine having a blower, mixing chamber, and cylinders, means to confine air drawn by the blower over parts of the engine to cool the same, means for the supply of hydrocarbon fuel to the mixing chamber, and means for the expansion of the fuel into a gas to refrigerate the air passing over said parts, said confining means comprising shroud means about the engine cylinders in communication with the blower and an air inlet duct arranged across the end of the cylinders and in communication with the shroud means, the fuel supply means including a coil disposed within the said duct, and an expansion valve operable to convert liquid into gas as it passes into the coil.

16. In combination with an internal combustion engine having a mixing chamber, means to confine air passing over the cylinders into the mixing chamber to cause the air to contact the exterior of the cylinders to cool the same, means for the supply of hydro-carbon fuel to the mixing chamber, and means disposed within the confining means for the expansion of the fuel into a gas to refrigerate the air before it passes over the cylinders.

17. In combination with an internal combustion engine having a mixing chamber, means to confine air passing over the cylinders into the mixing chamber to cause the air to contact the exterior of the cylinders to cool the same, means for the supply of hydrocarbon fuel to the mixing chamber, and means disposed within the confining means for the expansion of the fuel into a gas to refrigerate the air before it passes over the cylinders, said confining means comprising shroud means about the engine cylinders in communication with the mixing chamber.

18. In combination with an internal combustion engine having a mixing chamber and cylinders, means to confine air to direct it over the cylinders, and into the mixing chamber to cool the cylinders, means for the supply of hydrocarbon fuel to the mixing chamber, means for expansion of the fuel into a gas to refrigerate the air before it passes over the cylinders, said confining means comprising shroud means about the cylinders, and an inlet duct arranged across the ends of the cylinder and in communication with the shroud means, the fuel supply means containing an expansion coil disposed within said duct.

19. In combination with an internal combustion engine having a mixing chamber and cylinders, means to confine air and cause it to pass over and in contact with the cylinders into the mixing chamber, means for the supply of hydrocarbon fuel to the mixing chamber, means for expansion of the fuel into gas to refrigerate the air before it passes over the cylinders, said confining means comprising shroud means about the engine cylinders in communication with the mixing valve, and an inlet duct arranged across the cylinders and in communication with the shroud means, the fuel supply means including a fuel expansion coil disposed within the duct, said coil having an expansion valve operable to convert liquid fuel into gas as it passes through the expansion coil.

NELSON M. JONES.